United States Patent
Bono et al.

(10) Patent No.: US 12,198,448 B2
(45) Date of Patent: Jan. 14, 2025

(54) COMPUTER-ASSISTED METHOD FOR ANALYZING PERSON-RELATED ACCIDENT DATA

(71) Applicants: Caroline Bono, Hombrechtikon (CH); Rudolf Rothenbuhler, Hombrechtikon (CH)

(72) Inventors: Caroline Bono, Hombrechtikon (CH); Rudolf Rothenbuhler, Hombrechtikon (CH)

( * ) Notice: Subject to any disclaimer, the term of this patent is extended or adjusted under 35 U.S.C. 154(b) by 669 days.

(21) Appl. No.: 17/261,491

(22) PCT Filed: Jul. 18, 2019

(86) PCT No.: PCT/CH2019/000021
§ 371 (c)(1),
(2) Date: Jan. 19, 2021

(87) PCT Pub. No.: WO2020/014795
PCT Pub. Date: Jan. 23, 2020

(65) Prior Publication Data
US 2021/0319238 A1    Oct. 14, 2021

(30) Foreign Application Priority Data
Jul. 20, 2018  (EP) .................................... 18184771

(51) Int. Cl.
*G06V 20/59*   (2022.01)
*G06F 18/214*  (2023.01)
(Continued)

(52) U.S. Cl.
CPC ............ *G06V 20/59* (2022.01); *G06F 18/214* (2023.01); *G06V 10/147* (2022.01);
(Continued)

(58) Field of Classification Search
None
See application file for complete search history.

(56) References Cited

U.S. PATENT DOCUMENTS 3,080,548 A  *  3/1963  Hagen ..................... G06F 15/78
                                                    360/87
6,757,009 B1 *  6/2004  Simon .................. G06V 10/255
                                                    348/148
(Continued)

FOREIGN PATENT DOCUMENTS

DE        198 46 422 A1    4/2000
DE    10 2005 027 252 A1   12/2006

OTHER PUBLICATIONS

International Search Report issued on Oct. 24, 2019 in PCT/CH2019/000021 filed on Jul. 18, 2019, 3 pages.

*Primary Examiner* — Tsung Yin Tsai
(74) *Attorney, Agent, or Firm* — Oblon, McClelland, Maier & Neustadt, L.L.P.

(57) ABSTRACT

A computer-assisted method for analyzing person-related accident data of one or more vehicle occupants, the person-related accident data including at least image data of a video sequence of the vehicle occupants during an accident. The computer-assisted method includes at least one first step of detecting a pattern on the basis of the image data, and at least one second step of comparing the detected pattern with a number of previously stored patterns.

9 Claims, 2 Drawing Sheets

Figure 1:
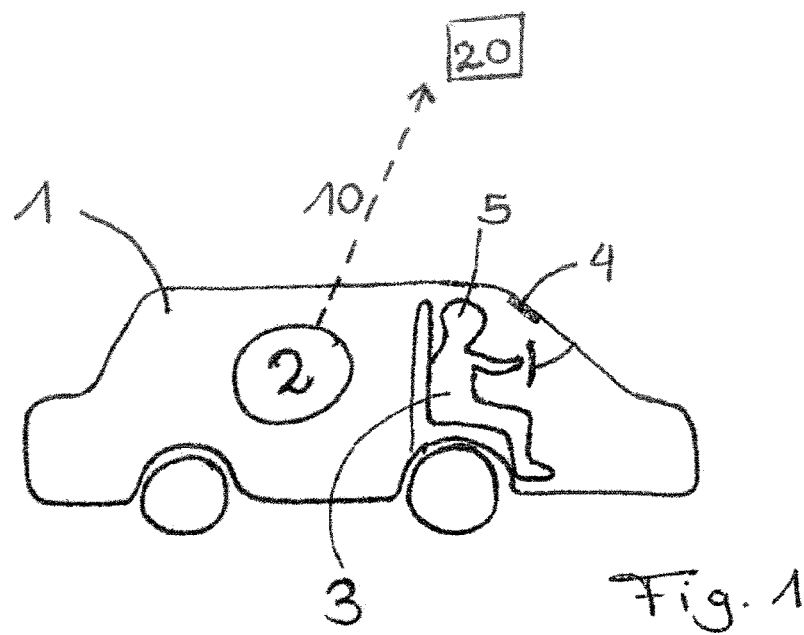

(51) Int. Cl.
*G06V 10/147* (2022.01)
*G06V 40/20* (2022.01)
*G07C 5/08* (2006.01)

(52) U.S. Cl.
CPC ............ *G06V 20/597* (2022.01); *G06V 40/28* (2022.01); *G07C 5/0866* (2013.01)

(56) References Cited

U.S. PATENT DOCUMENTS

| | | | |
|---|---|---|---|
| 8,335,616 B2* | 12/2012 | Neal | B60R 25/00 |
| | | | 701/45 |
| 8,538,770 B2* | 9/2013 | Papier | G16H 30/20 |
| | | | 128/920 |
| 9,928,432 B1* | 3/2018 | Sathyanarayana | B60W 40/09 |
| 10,189,479 B2* | 1/2019 | Innes | B60W 40/09 |
| 10,274,338 B2* | 4/2019 | Boss | G01C 21/3691 |
| 10,759,424 B2* | 9/2020 | Misu | A61B 5/0077 |
| 2002/0021828 A1* | 2/2002 | Papier | G16H 50/20 |
| | | | 382/128 |
| 2005/0131607 A1* | 6/2005 | Breed | B60R 25/255 |
| | | | 701/45 |
| 2005/0195383 A1* | 9/2005 | Breed | B60N 2/002 |
| | | | 356/28 |
| 2016/0001781 A1 | 1/2016 | Fung et al. | |
| 2017/0291611 A1* | 10/2017 | Innes | B60W 40/09 |
| 2017/0341658 A1* | 11/2017 | Fung | G06V 40/45 |
| 2018/0022358 A1 | 1/2018 | Fung et al. | |
| 2018/0050696 A1* | 2/2018 | Misu | A61B 5/6893 |
| 2018/0075309 A1* | 3/2018 | Sathyanarayana | G06V 40/20 |
| 2018/0162307 A1* | 6/2018 | Boss | G08G 1/0129 |
| 2019/0152489 A1 | 5/2019 | Innes et al. | |
| 2019/0241190 A1 | 8/2019 | Fung et al. | |

* cited by examiner

COMPUTER-ASSISTED METHOD FOR ANALYZING PERSON-RELATED ACCIDENT DATA

The present invention relates to a computer-assisted method for analysing person-related accident data of one or more vehicle occupants, and a device for computer-assisted analysing of person-related accident data of one or more vehicle occupants.

Due to a traffic accident, a vehicle driver or other vehicle occupants may sustain various injuries. Particularly frequently-occurring injuries in an accident, more particularly a rear-end collision, of the cervical spine (due to a sudden and unforeseen movement of the head compared with the fixed torso), of the head itself and thorax, but also the torso and extremities. The various hurtling movements of the head compared with the torso during the accident when held by the seatbelt occur, for example, within a very short time in the range of a few hundred milliseconds. The consequential injuries and/or medical symptoms are designated as whiplash trauma (also cervical spine distortion or whiplash syndrome) and may extend in their severity from overstretched ligaments to spine fractures or fatal injuries.

However, unfavourable collision angles may cause the holding function of the seatbelt to fail, resulting in unlimited multiple trauma, which can be proven by imagery. Most of the injuries occurring, however, cannot be represented or only with difficulty in conventional image-providing medical procedures, e.g. in X-ray diagnostics, which may make, among other things, a medical diagnosis and provision of proof for payment claims on insurance policies due to long-term damage more difficult.

On the other hand, with many injuries, timely medical treatment intended for the relevant injury is important to ensure as good as possible a healing of the patient and to be able to prevent or at least reduce possible long-term consequences.

Patent application EP18169880.4 not yet disclosed on the application date of this application describes a system and a method for recording person-related accident data in a vehicle. In this case, during an accident of the vehicle, for example a motor vehicle, image data of the vehicle occupant or occupants are captured and saved by a high-speed camera. The image data may then be used to analyse the accident event from a medical point of view and thus allow conclusions to be drawn about possible injuries to the vehicle occupants.

The task of the present invention consists of providing an alternative or even improved computer-assisted method of analysing person-related accident data or even a device for computer-assisted analysing of person-related accident data of one or more vehicle occupants.

The task is solved by a computer-assisted method of analysing person-related accident data of one or more vehicle occupants, a device for computer-assisted analysing of person-related accident data of one or more vehicle occupants and an accident assistance system. In so doing, the devices may also be further formed by the characteristics of the method listed below or even in the subordinate claims or vice versa or even, the characteristics of the method listed below or in the subordinate claims may also be used jointly for further embodiment.

A computer-assisted method according to the invention is used for analysing person-related accident data of one or more vehicle occupants, wherein the person-related accident data comprise at least image data of a video sequence of the vehicle occupant during an accident. The method comprises at least one first step of detecting a pattern using the image data and at least one second step of comparing the detected pattern with a number of previously-stored patterns, preferably a plurality of previously-stored patterns.

By "number" in the context of the present application "one or more" is always to be understood, whereas the term "plurality" designates several, i.e. more than one.

As "pattern" or even "accident pattern", in this case, characteristics are understood that have been extracted from the image data and characterise the circumstances of the accident in relation to the vehicle occupant. Such characteristics may particularly be kinematic data.

In so doing, the video sequence preferably comprises a sufficient number of images, i.e. a sufficient quantity of image data to be able to detect a pattern from it as described below. To do this, the video sequence may, for example, be provided by means of a high-speed camera, wherein the high-speed camera is designed to record a large number of frames per second (fps), for example, at least 700 fps or at least 1000 fps. In so doing, the video sequence preferably comprises a sufficiently long recording time to capture the entire movement sequence of one or more vehicle occupants during the accident occurrence and, as appropriate, a short duration of time before and/or during the accident occurrence. For example, the video sequence may correspond to a recording time of 10 or 15 seconds.

A result of the comparison made in the second step may, for example, be that the detected pattern corresponds to a previously-recorded pattern, wherein the previously-recorded pattern may particularly be based on the image data recorded in the preceding accident occurrences. In this case, in other words, where the pattern corresponds, further information can be provided that is determined from previous accidents. Therefore, for example, it is possible to use empirical values such as, for example, injuries occurring from previous accidents. As the detection of the pattern and the comparison of the pattern happen automatically, better results can be achieved than would be for a manual analysis of the case, for example, if a first-aider and/or treating doctor analyses the provided video sequence only visually and without computer assistance.

The determined pattern may, for example, also be used for improved evidence for payment claims on insurance policies, for example, due to long-term damage.

The correspondence with the previously-stored and a determined pattern in this case does not have to be a one hundred percent correspondence. In this case, it may only be a partial correspondence, for example, within a previously-set confidence interval such as, for example, 95% or 90%. Also, the comparison unit may, for example, be formed to detect a pattern which respectively corresponds partially to two previously-provided patterns and to provide any data or information output corresponding to these two previously-provided patterns.

Preferably, a detected and/or previously-stored pattern comprises a movement sequence of the vehicle occupant during the accident, particularly a time sequence of acceleration processes of a head and/or a neck and/or a thorax and/or a torso and/or extremities of the vehicle occupants and/or a time sequence of displacements of a head 10 and/or a neck and/or a torso and/or a thorax and/or extremities of the vehicle occupant.

Such a movement sequence is given by a time sequence of individual images of the video sequence, wherein the individual images are evaluated and combined into a corresponding movement sequence. This movement sequence may, for example, relate to individual or several body parts of the vehicle occupant (such as, for example, head, neck, thorax, torso and/or extremities) or also to relative movements of individual or several body parts to each other. The individual images may, therefore, for example, be evaluated with respect to the corresponding position of the relevant body part.

By an acceleration or even an acceleration process, in the context of the present application both positive, i.e. increasing the speed, and negative, i.e. decelerating accelerations and acceleration processes are to be understood.

As injuries due to accident are essentially caused by one or more such movement sequences, such a pattern may be a good indicator for injuries that occur based on or comprising a movement sequence. The automatic evaluation of the image data, i.e. the detection of a pattern from the image data, may therefore enable, for example, an estimation of possible injuries to be obtained even before an initial investigation or in coordination with the same. As a result, for example, an initial treatment can be adapted well as possible to the injury or injuries and/or the risk of overlooking injuries may be reduced and/or the injuries or even the various body regions may be treated or investigated in good time according to the severity of the injuries (to be expected). Therefore, for example, it is generally possible to provide better medical (initial) care of the person involved in the accident.

Preferably, the previously-stored patterns are respectively assigned medical diagnostic data and the method further comprises a third step of outputting medical diagnostic data that are assigned to the detected pattern. Further preferably, the medical diagnostic data comprise at least a medical diagnosis and/or information on medical long-term consequences and/or the medical diagnostic data comprise an indicator value specifying the degree of a possible severity of an injury of the vehicle occupant. With such medical diagnostic data, for example, it is possible to be able to detect and/or estimate in a simple manner possible injuries of the vehicle occupant, particularly in advance, i.e. before an initial examination. For example, the indicator value specifying the value of an injury severity may be provided for various regions of the body and/or body parts and a timely sequence of treatment of the injuries of the person involved in the accident can be established using the relevant indicator values. Through the method, diagnostic data can be provided quickly and as timely as possible. This may be particularly decisive for life-threatening injuries. Furthermore, the medical diagnostic data may be used, for example, as a support for conventional medical diagnostic methods, particularly image-generating medical procedures such as, for example, an X-ray examination, to make a medical diagnosis easier and/or to improve it.

Preferably, the person-related accident data furthermore comprise physical operating data of the vehicle, i.e. its speed and/or acceleration, directly before and/or during the accident. Therefore, it is possible, for example, to use this in addition to the image data for detecting a pattern.

Preferably, the method according to the invention is undertaken by using an algorithm for implementing machine learning, wherein the algorithm is further preferably suitable for detecting in advance using a provided set of person-related accident data, a number of patterns from image data which are stored as previously-stored patterns.

By machine learning, in this case, generally the generation of knowledge (in this case, extraction of certain patterns from the person-related accident data, particularly the image data, and possibly in connection with medical diagnostic data) from experience (i.e. previously-occurring accidents) is understood. In principle, the algorithm is designed to learn from examples, i.e. previously-occurring accidents, therefore extracting corresponding patterns and then assessing unknown person-related accident data, particularly image data.

For learning the patterns which are then stored as previously-provided patterns, the algorithm is provided preferably in advance with a set of person-related accident data (i.e. a plurality of person-related accident data), particularly image data, from previous accidents, particularly in connection with corresponding medical diagnostic data. After this learning phase, the algorithm is then capable of running a method described above at least partially, particularly to detect a pattern from the person-related accident data provided and to assign this, for example, to a certain injury and/or injury category. For example, various injuries may be grouped into injury categories.

With such an algorithm for implementing machine learning it is possible, for example, to run a method described above at least partly automatically. In so doing, particularly a large quantity of data (previously-provided person-related accident data from previous accidents) may be provided, on the basis of which the previously-provided patterns are determined. In addition, for example, when an accident occurs, a corresponding pattern is determined quickly and in a simple manner.

Preferably, the previously-stored patterns are stored in an accident database. In so doing, on the one hand it is possible, for example, to enable access to the previously-stored patterns. On the other hand, such a database allows, for example, this to be updated and/or extended, for example, by storing additional and/or newly-determined patterns and/or by adding further medical diagnostic data.

In particular, the algorithm mentioned above for implementing machine learning may be designed to store a newly-detected pattern in the database.

A device according to the invention is used for computer-assisted analysis of person-related accident data of one or more vehicle occupants, wherein the person-related accident data comprise at least image data of a video sequence of the vehicle occupant during an accident. The device comprises a detection unit for detecting a pattern using the image data and a comparison unit for comparing the detected pattern with a number of previously-stored patterns. Preferably, the device further comprises an output unit for outputting medical diagnostic data assigned to the detected pattern. In so doing, for example, it is possible to achieve the effects described above in relation to the computer-assisted method even with such a device.

An accident assistance system according to the invention comprises a device described above for computer-assisted analysis of person-related accident data and a high-speed camera for capturing image data of a video sequence of the vehicle occupant during an accident and a data memory, preferably a circular memory, for storing the image data recorded by the high-speed camera. Preferably, the accident assistance system further comprises an operating data capture unit for capturing physical operating data of a vehicle. Therefore it is possible, for example, to provide information on a possible injury of the vehicle occupant more quickly.

Further characteristics and purposes of the invention ensue from the description of the illustrative examples using the appended drawings.

Figure 2:
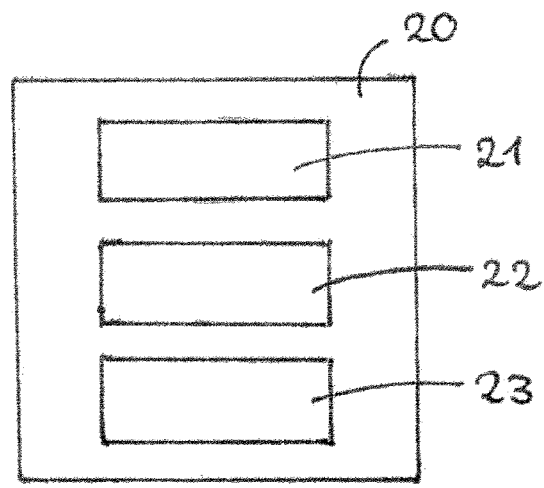
Figure 3:
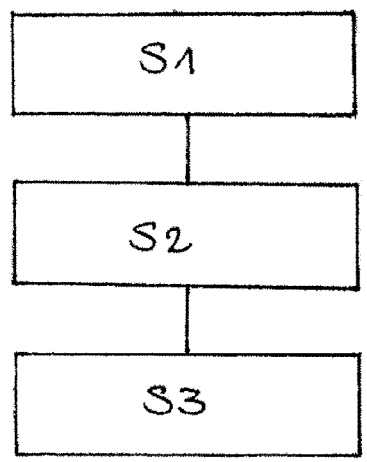

FIG. 1 is a schematic view of a vehicle with a system for capturing person-related accident data connected to a device for computer-assisted analysing of person-related accident data, FIG. 2 is a schematic view of a device for computer-assisted analysing of person-related accident data according to an illustrative example of the present invention and FIG. 3 shows schematically a method for analysing person-related accident data according to the present invention.

FIG. 1 shows a vehicle 1 with a vehicle occupant 3 and a schematically-shown vehicle-internal system 2 for capturing person-related accident data connected via a data connection to a device 20 according to the invention for computer-assisted analysing of person-related accident data. The vehicle 1 shown in FIG. 1 as an example is a motor vehicle, but it may, for example be designed as a utility vehicle.

The vehicle-internal system 2 for capturing person-related accident data comprises at least one camera designed as a high-speed camera 4 for capturing image data, a data memory not shown in more detail designed as a circular memory and a transmission unit not shown in more detail for transmitting the data stored in the circular memory to the device 20. Optionally, the system 2 also comprises an operating data capture unit (not shown) for capturing physical operating data of the vehicle 1.

The high-speed camera 4 of the system 2 is designed and arranged in the vehicle 1 in such a way that it is suitable for capturing a region of the vehicle interior, in which the vehicle occupant 3 is located, i.e. to record a video sequence in the form of images of the vehicle occupant 3. In so doing, the high-speed camera 4 does not have to capture the entire body of the vehicle occupant 3, rather it is sufficient to capture an upper section of their body, particularly the head 5, neck and upper body and/or shoulder region. Preferably, the camera also captures distal regions of the body.

The high-speed camera 4 exhibits a high recording speed, for example, of at least 700 fps, preferably at least 1000 fps. The images of the video sequence are captured by the high-speed camera 4 as digital image data.

The high-speed camera 4 is connected by a data connection, for example, a data cable, to the circular memory. The circular memory is suitable for storing the image data 20 captured by the high-speed camera 4 in digital form. Alternatively, the circular memory can also be an internal memory of the high-speed camera 4.

A circular memory is a digital memory with specified size or even storage capacity in which data, in the present case, including image data captured by the high-speed camera, can be continuously stored. If the maximum size of the circular memory is reached and the circular memory is full, then the respective oldest saved element is overwritten, so that the data is saved in what is called a loop. Therefore, the graphical representation of the memory is a ring shape. The circular memory may, for example, be implemented with a suitable piece of software, by means of which the storage and reading of data in a digital memory is controlled accordingly. Preferably, the size of the circular memory or its storage capacity is sufficient, during a time interval of several seconds, for example 10 s or 20 s, to store the images recorded by the high-speed camera and any physical operating data of the vehicle to be saved, before these are overwritten again.

The optional operating data capture unit is preferably also connected by a data connection, for example, a data cable, to the circular memory, for saving the physical operating data of the vehicle 1, recorded by the operating data capture unit, in the circular memory. The operating data capture unit may, for example, be designed as speed sensor and/or as a position sensor, for example, as GPS and/or as an accelerometer for capturing an instantaneous speed or even position or even acceleration of the vehicle 1 as operating data.

Furthermore, the circular memory is connected by a data connection, for example, a data cable, to the transmission unit of the system 2. The transmission unit is suitable for transmitting the image data saved in the circular memory and optionally the operating data as person-related accident data 10 by means of a wireless transmission method to the device 20, preferably encrypted. To do this, the transmission element exhibits a data interface not shown.

The system 2 may comprise even further components not described in more detail such as, for example, a control unit for controlling the individual components of the system 2, a sensor for establishing an accident, an illumination device for illuminating the vehicle interior, an analysis unit for analysing data and/or other data memories.

When the system 2 is operating, the high-speed camera 4 continuously films the vehicle occupant 3 while the vehicle 1 is travelling, i.e. it captures image data of the vehicle occupant 3, and transmits these to the circular memory. Optionally, at the same time, by the operating data capture unit, preferably continuously, operating data of the vehicle 1 are recorded and also transmitted to the circular memory. As long as no accident occurs, the data stored in the circular memory are respectively overwritten by new data again depending on a certain recording time that depends, among other things, on the recording capacity of the circular memory.

During an accident, this continuous data storage is interrupted, so that the data present in the circular memory is not overwritten any more. Therefore, after the end of data storage, image data and optionally physical operating data in the circular memory are present for a period in which the accident occurred. These are then transmitted as person-related accident data 10 by the transmission unit to the device 20 for analysing person-related accident data. Alternatively, the person-related accident data may also be transmitted to an external location, for example, to a rescue control centre and/or a further medical facility and/or a data memory external to the vehicle, for example, an external server or a cloud and be provided by this external location for usage in the device 20. The transmission of the person-related accident data 10 thereby occurs wirelessly, for example, by radio, particularly mobile radio or Internet, and may, for example, be done together with an electronically-made emergency call (known as an eCall). Preferably the person-related accident data 10 are transmitted in encrypted format, for example, by means of OpenPGP, wherein the person-related accident data 10 are encrypted by the transmission unit by means of a public key generated by the device 20 or even the external location and only decryptable again by the corresponding private key of the device 20 or even the external location.

Alternatively, the device 20 for computer-assisted analysing of person-related accident data may be implemented in a mobile device (not shown in the figures), which guides a first aider and, for example, may be connected by a data connection, for example, a data cable, to the transmission unit. The mobile device together with the vehicle-internal system 2 is an example of an accident assistance system. This is used for timely recognition of possible injuries of the vehicle occupants.

The device 20 shown schematically in FIG. 2 for computer-assisted analysing of person-related accident data comprises at least one detection unit 21, a comparison unit 22 and an output unit 23. The operation of the device 20 for computer-assisted analysing of person-related accident data is described in the following with reference to FIG. 3.

In a first step S1 (see FIG. 3), of a computer-assisted method according to the invention for analysing person-related accident data, the detection unit 21 detects a pattern M(x) from the image data of the person-related accident data 10. Optionally, the detection unit may use, in addition to the image data, the physical operating data of the vehicle 1 for detecting the pattern M(x).

A pattern M generally describes one or more movement sequences of the vehicle occupant 3 during the accident. For example, a pattern may comprise an acceleration or even a time sequence of accelerations of at least one section of the body of the vehicle occupant 3. Alternatively or in addition, a pattern may comprise a time sequence of relative and/or absolute displacements of at least one section of the body of the vehicle occupant 3. Such a section of the body may, for example, be the head 5 and/or the neck and/or the thorax and/or the torso and/or an extremity, e.g. an arm of the vehicle occupant 3. Particularly, in so doing, relative displacements and/or accelerations of various body parts in relation to each other may be considered such as, for example, a relative displacement of the head 5 in relation to the shoulder region or upper body of the vehicle occupant 3. Optionally, a pattern may also comprise the physical operating data, for example, the acceleration and/or speed, of the vehicle immediately before and/or during the accident.

Subsequently, the comparison unit 22 compares, in a second step S2 the pattern M(x) detected by the detection unit with a number of previously-stored patterns M(1) to M(n). The previously-stored patterns may, in this case, for example, be stored in a database wherein the database may be an internal memory of the device 20, or the comparison unit 22 accesses a device-external database (also designated as an accident database). A result of the comparison may be, in this case, that the detected pattern M(x) corresponds to one of the previously-stored patterns M(1) to M(n), or that the detected pattern M(x) does not correspond to any of the previously-stored patterns.

For example, the database may comprise a number of n patterns M(1) to M(n), wherein n is a natural number greater than or equal to 1 (n≥1). Preferably, the database comprises several patterns M(1) to M(n), i.e. more than one pattern, therefore n>1. For patterns M(1) to M(n), this preferably relates to various patterns.

Preferably, further medical diagnostic data D(1) to D(p) are stored (or even sets of medical diagnostic data) in the database, where p is also a natural number greater than or equal to 1 (p≥1). Preferably, the number p corresponds to the medical diagnostic data D(1) to D(p) of the number n of patterns previously stored in the database (i.e. p=n), wherein each of the n patterns M(1) to M(n) are precisely assigned one set of medical diagnostic data D(1) to D(p).

A set of medical diagnostic data D(i) (13i≤p) comprises at least one medical diagnosis and/or a piece of information about medical long-term consequences. The medical diagnostic data, i.e. the medical diagnosis and/or the information about medical long-term consequences in this case relates to information obtained from a previous accident of a particular other vehicle occupant, in which the pattern M(i) has been detected, to which the set of medical diagnostic data D(i) is assigned.

In this case, the medical diagnostic data comprise information on the type and/or severity of injuries of the vehicle occupant. In so doing, not only are injuries established immediately after the accident considered, but also effects occurring only later on, i.e. days, weeks or even months after the accident (long-term consequences).

Alternatively or in addition, a severity of the injuries may be assigned to a set of medical diagnostic data D(i). To do this, the injuries may be classified, for example, as slight, moderate, serious, very serious or life-threatening and a corresponding indicator value (e.g. "slight" or "moderate" or "serious" or "very serious" or "life-threatening" or according to a scale of 1 (slight) to 5 (life-threatening)) may be stored in the medical diagnostic data D(i).

In the event that in step S2, the comparison of the detected pattern M(x) with the previously-stored patterns M(1) to M(n) results in that the detected patterns M(x) corresponding to one of the previously-stored patterns, i.e. M(x)=M(j) with 13j≤n, the output unit 23 (see FIG. 2) outputs in step S3 (see FIG. 3) the diagnostic data D(j) corresponding to this pattern and/or the pattern M(j) itself.

For storing the previously-stored pattern and the relevant medical diagnostic data in a database, for example, it is possible to proceed as follows: respectively pairs of person-related accident data and the medical diagnostic data assigned to this are provided. The person-related accident data and medical diagnostic data may, for example, be determined from previous accidents. By means of a suitable algorithm, from the image data, possibly in connection with the physical operating data of the vehicle and/or the medical diagnostic data, corresponding patterns are detected. Preferably, the algorithm is based on a method of machine learning, i.e. it is suitable for detecting corresponding patterns from the data independently and only using the data provided.

Each pattern thus detected is then saved as a previously-stored pattern with the corresponding medical diagnostic data in the database or in another data memory.

In the event that in step S2 of the comparison of the detected pattern M(x) with the previously-stored patterns M(1) to M(n) it results that the detected pattern M(x) does not correspond to any of the previously-stored patterns, the output unit is preferably designed to output a corresponding piece of information, for example, in the form of a text and/or a visual or audible signal. Alternatively or in addition, the output unit may also output the detected pattern M(x) itself.

Optionally, the detected pattern M(x), which corresponds to none of the previously-stored patterns M(1) to M(n), is then also stored i.e. saved in the database, and in the presence of corresponding diagnostic data that, for example, comprise an initial and/or follow-on diagnosis and/or information about long-term consequences, these may then be assigned later on to the newly-stored pattern M(x) and be saved in the database in connection with this.

The invention claimed is:

1. A computer-assisted method for analyzing person-related accident data of one or more vehicle occupants, wherein the person-related accident data comprise at least image data of a video sequence of the vehicle occupant during an accident, the video sequence being recorded by a high-speed video camera at a speed of at least 700 frames per second, the computer-assisted method comprising:
   detecting a pattern describing a movement sequence of a head or neck of the occupant in relation to a shoulder or upper body of the occupant due to acceleration of the vehicle during an accident, using the image data;
   comparing the detected pattern with a number of previously-stored patterns of previous accidents, wherein
   the previously-stored patterns comprise time sequences of acceleration processes of a head or neck in relation to a shoulder or upper body of vehicle occupants, and a time sequence of displacement of the head or neck of the vehicle occupants, and the previously-stored patterns are respectively assigned medical diagnostic data; and outputting medical diagnostic data that are assigned to the detected pattern, the medical diagnostic data comprising at least a medical diagnosis and an indicator value specifying a degree of a possible severity of an injury of the vehicle occupant allowing to detect possible injuries of the vehicle occupants.

2. The computer-assisted method according to claim 1, wherein the medical diagnostic data comprise one piece of information about medical long-term consequences.

3. The computer-assisted method according to claim 1, wherein the person-related accident data further comprise physical operating data of the vehicle immediately before and/or during the accident.

4. The computer-assisted method according to claim 1, which is conducted by using an algorithm for implementing machine learning.

5. The computer-assisted method according to claim 4, wherein the algorithm is suitable for detecting a number of patterns from image data in advance using a set of personal accident data provided, which image data are saved as previously-stored patterns.

6. The computer-assisted method according to claim 1, wherein the previously-stored patterns are saved in an accident database.

7. A device for computer-assisted analyzing of person-related accident data of one or more vehicle occupants, wherein the person-related accident data comprise at least image data of a video sequence of the vehicle occupant during an accident, the video sequence being recorded by a high-speed video camera at a speed of at least 700 frames per second, the device comprising:

processing circuitry configured to detect a pattern describing a movement sequence of a head or neck of the occupant in relation to a shoulder or upper body of the occupant due to acceleration of the vehicle during an accident, using the image data, and compare the detected pattern, comprising a movement sequence of the vehicle occupant during the accident with a number of previously-stored patterns of previous accidents, wherein the previously-stored patterns comprise time sequences of acceleration processes of a head or neck in relation to a shoulder or upper body of vehicle occupants, and a time sequence of displacement of the head or neck of the vehicle occupants, the previously-stored patterns respectively are assigned medical diagnostic data, and the processing circuitry is configured to output medical diagnostic data, assigned to the detected pattern, the medical diagnostic data comprising at least a medical diagnosis and an indicator value specifying a degree of a possible severity of an injury of the vehicle occupant allowing to detect possible injuries of the vehicle occupants.

8. An accident assistance system comprising:

the device according to claim 7;

a high-speed camera configured to capture image data of a video sequence of the vehicle occupant during the accident; and a data memory configured to save the image data recorded by the high-speed camera.

9. The accident assistance system according to claim 8, further comprising an operating data recorder configured to record physical operating data of the vehicle.

\* \* \* \* \*